(12) United States Patent
Schmidt

(10) Patent No.: US 6,443,271 B2
(45) Date of Patent: Sep. 3, 2002

(54) SHOCK ABSORBER WITH CUP-SHAPED STOP CAP

(75) Inventor: Armin Schmidt, Stolberg (DE)

(73) Assignee: Weforma GmbH, Stolberg (DE)

( * ) Notice: Subject to any disclaimer, the term of this patent is extended or adjusted under 35 U.S.C. 154(b) by 0 days.

(21) Appl. No.: 09/880,354

(22) Filed: Jun. 13, 2001

(30) Foreign Application Priority Data

Jun. 14, 2000 (DE) .......................................... 100 28 586

(51) Int. Cl.$^7$ ................................................. F16F 9/44
(52) U.S. Cl. ........................ 188/285; 188/284; 188/286
(58) Field of Search ............................. 188/281, 282.1, 188/283, 284, 285, 286, 287, 319.2, 322.17

(56) References Cited

U.S. PATENT DOCUMENTS

| | | | | |
|---|---|---|---|---|
| 3,598,206 A | * | 8/1971 | Hennells ..................... | 188/287 |
| 3,693,767 A | * | 9/1972 | Johnson ...................... | 188/285 |
| 3,782,710 A | * | 1/1974 | Selke et al. .................. | 267/118 |
| 3,990,548 A | | 11/1976 | Schupner | |
| 4,026,533 A | * | 5/1977 | Hennells ..................... | 267/124 |
| 4,044,865 A | * | 8/1977 | Tourunen ..................... | 188/287 |
| 4,056,040 A | | 11/1977 | Fussangel | |
| 4,151,784 A | | 5/1979 | Fussangel | |
| 4,174,098 A | * | 11/1979 | Baker et al. ................. | 267/8 R |
| 4,318,535 A | * | 3/1982 | Imai ............................ | 267/8 R |
| 4,321,987 A | * | 3/1982 | Dressell, Jr. et al. ....... | 188/285 |
| 4,475,722 A | * | 10/1984 | Paton et al. .................. | 267/202 |
| 4,571,162 A | * | 2/1986 | Knox ........................... | 417/554 |
| 4,690,255 A | * | 9/1987 | Heideman .................... | 188/287 |
| 5,566,796 A | * | 10/1996 | De Kock ..................... | 188/299 |
| 5,598,904 A | * | 2/1997 | Spyche, Jr. .................. | 188/287 |
| 5,860,497 A | * | 1/1999 | Takahashi .................... | 188/314 |

FOREIGN PATENT DOCUMENTS

| | | |
|---|---|---|
| DE | 6751258 | 1/1969 |
| DE | 2633014 | 2/1977 |
| DE | 7834927 | 3/1979 |
| DE | 2506451 | 12/1984 |
| FR | 2580756 A1 * | 10/2001 |
| WO | WO92/07745 | 5/1992 |

OTHER PUBLICATIONS

ACE Company Catalog, "Industrie Stossdaempfer" (Industrial Shock Dampers) of Aug., 1995, p. 20, ACE Stossdaempfer GmbH, Langenfeld, Germany.

* cited by examiner

Primary Examiner—Jack Lavinder
Assistant Examiner—Melody M. Burch
(74) Attorney, Agent, or Firm—W. F. Fasse; W. G. Fasse

(57) ABSTRACT

A shock absorber includes a housing, a piston slidable in the housing, a piston rod extending outwardly from the piston, a cup-shaped stop cap secured to the free end of the piston rod, and an adjusting ring which protrudes from the end of the housing and can be rotated to adjust the damping coefficient by adjusting the open cross-section of throttle openings through which a hydraulic fluid is displaced by the piston. When a load pushes against the stop cap, the maximum travel is limited by the stop cap bearing directly against a rigid end ring of the housing. The load forces are introduced directly from the stop cap into the housing, without applying any loads onto the adjusting ring or other components. The adjusting ring and a return spring coaxially on the piston rod are accommodated within the stop cap in the fully retracted position.

14 Claims, 2 Drawing Sheets

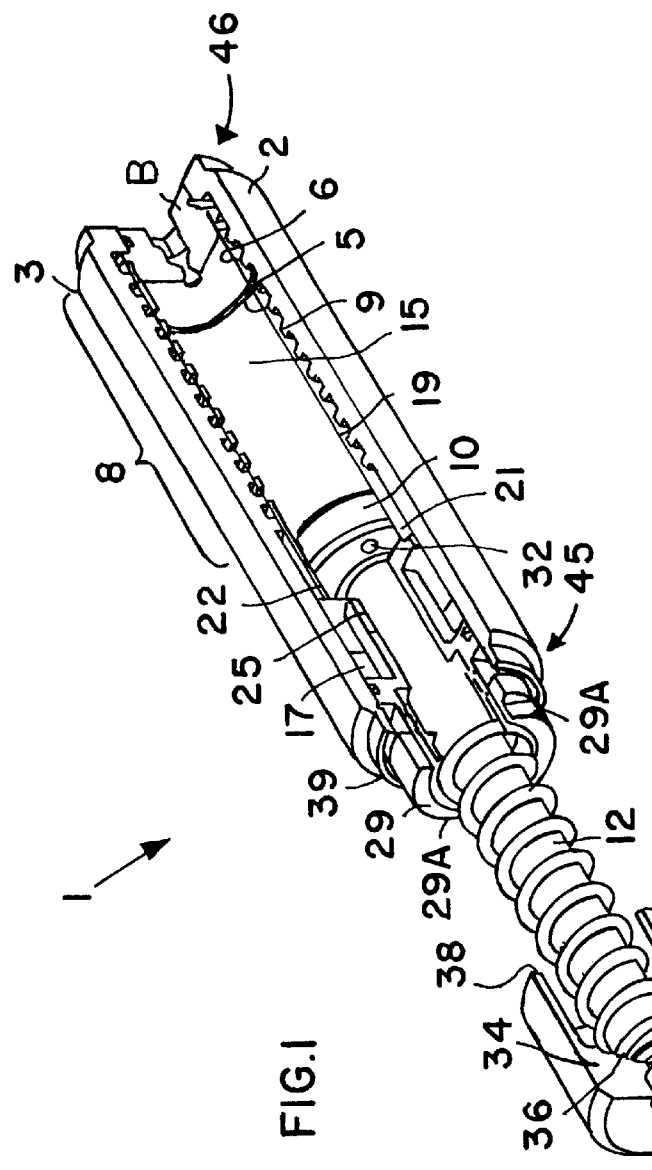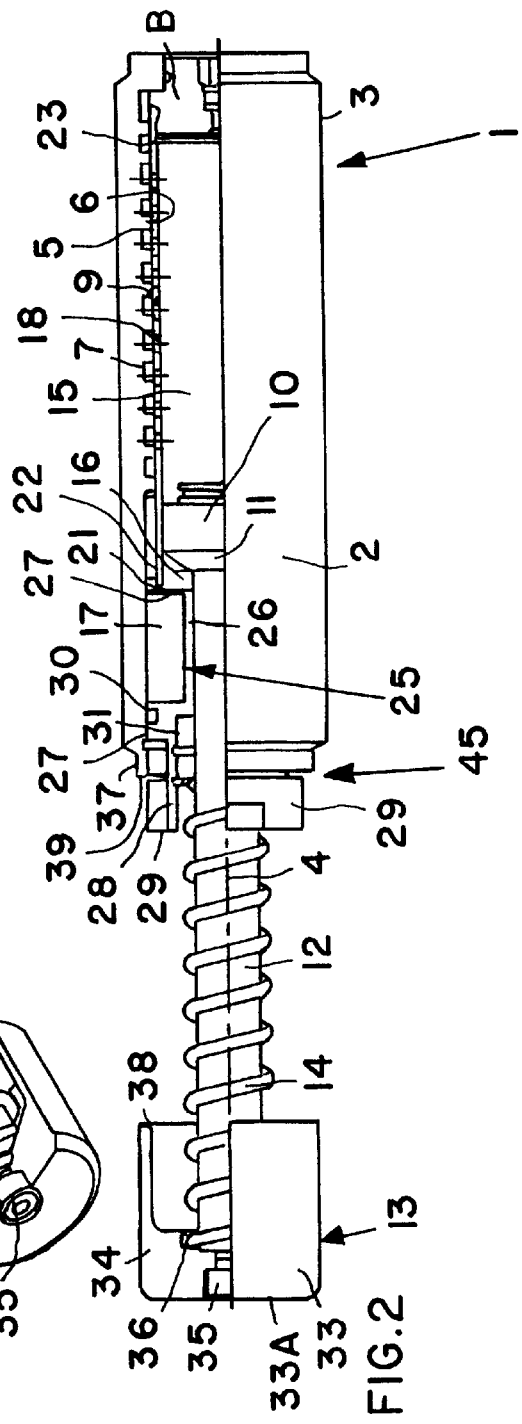

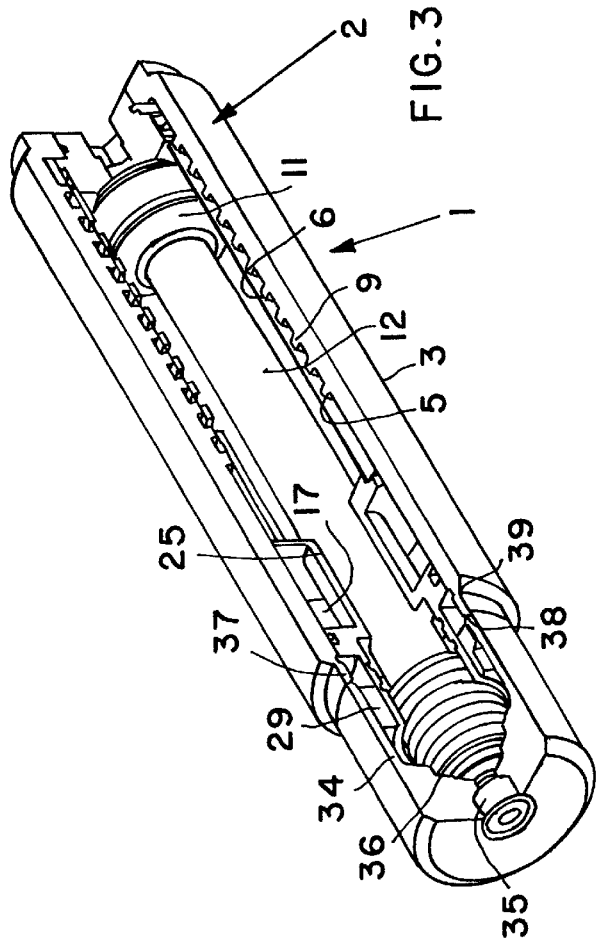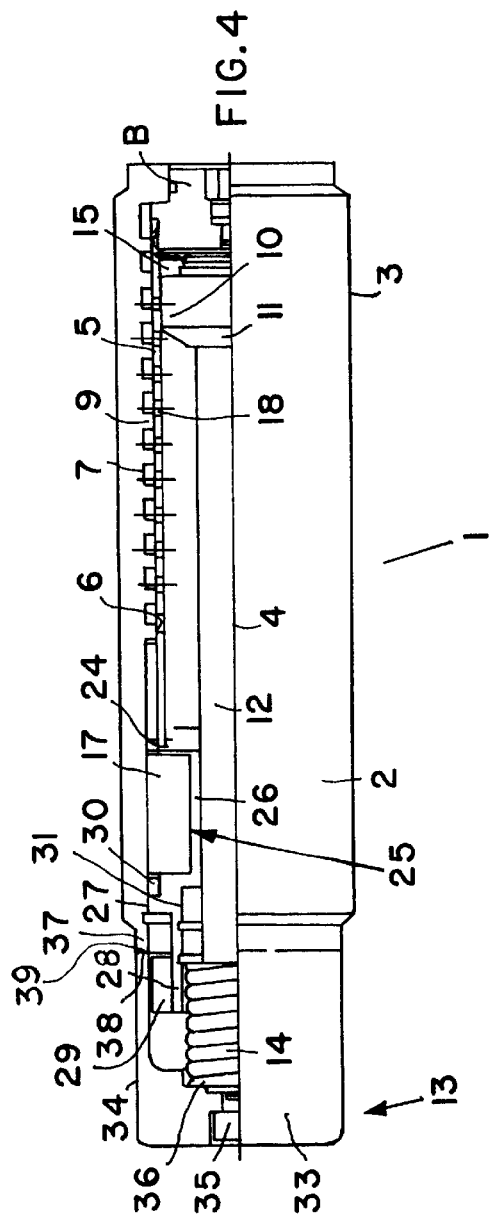

SHOCK ABSORBER WITH CUP-SHAPED STOP CAP

PRIORITY CLAIM

This application is based on and claims the priority under 35 U.S.C. §119 of German Patent Application 100 28 586.4, filed on Jun. 14, 2000, the entire disclosure of which is incorporated herein by reference.

FIELD OF THE INVENTION

The invention relates to a shock absorber for taking up the impact shock of a moving component, and then slowing down and stopping the component. The shock absorber includes a housing, a piston axially slidably arranged in the housing, a piston rod connected to the piston and extending outwardly through a seal at an end of the housing, and a contact or stop element connected to the end of the piston rod opposite the piston. A moving load component, which is to be slowed down and stopped, strikes against the stop element, whereupon the piston is slidingly moved while displacing a hydraulic fluid through a throttling arrangement to dissipate the kinetic energy. A mechanical support element limits the maximum stroke of the piston.

BACKGROUND INFORMATION

The above described general type of shock absorber is conventionally known for slowing down and stopping various moving load components, such as moving machine parts, items being transported on a conveyor belt or the like, and any other component that must be slowed down and stopped in a gentle damping manner.

A conventionally known shock absorber of this type may further include an adjusting mechanism including an adjusting ring protruding from an end of the shock absorber. This mechanism allows the damping constant or coefficient of the shock absorber to be adjusted by rotating the adjusting ring. For this purpose, the adjusting ring is securely fixed in a torque transmitting manner to a rotatable adjusting sleeve. A so-called pressure sleeve is located within the adjusting sleeve, and in turn, the piston is axially slidably arranged in the inner space within the pressure sleeve. The pressure sleeve has throttle holes therein, and the effective open cross-sectional area of these throttle holes is variable by rotating the adjusting sleeve while the pressure sleeve remains stationary i.e. does not rotate. The rotation of the adjusting sleeve is achieved by rotating the adjusting ring provided at an end of the housing.

In the conventionally known shock absorber, the adjusting ring that protrudes out of an end of the housing directly serves as a mechanical support element that limits the maximum travel or stroke of the piston. Namely, the stop element and/or the load to be slowed down and stopped will strike against and be positively stopped by the adjusting ring, after the stop element and the connected piston have traveled through the maximum allowable stroke.

A disadvantage of such a conventional arrangement is that very great forces will be introduced into the support element, i.e. the adjusting ring in the conventional shock absorber, when a large load has contacted and pushed against the stop element and thereby pushed the piston through its maximum allowable stroke. As a result, the adjusting ring is very heavily loaded, for example even to the extent that plastic deformations arise in the adjusting ring or in various force transmitting or bearing components within the shock absorber housing. As a result, the adjustability of the shock absorber is negatively influenced or even made impossible.

SUMMARY OF THE INVENTION

In view of the above it is an object of the invention to provide a shock absorber having an adjusting ring arranged at an end of the shock absorber housing, which is further developed and improved in such a manner so that the moving load component or the stop element will not bear directly against and apply a damaging load to the adjusting ring when the piston has been moved to the extent of the maximum allowable piston stroke. It is a further object of the invention to provide a compact shock absorber construction which fully-protects the adjusting ring by preventing any stop loads from being applied to the adjusting ring. The invention further aims to avoid or overcome the disadvantages of the prior art, and to achieve additional advantages, as apparent from the present specification.

The above objects have been achieved according to the invention in a shock absorber including a housing, a piston axially slidably arranged in the housing, a piston rod connected to the piston and extending through a seal at one end of the housing, and a contact or stop element that is arranged on an end of the piston rod opposite the piston and that is adapted to be contacted by a moving load component that is to be slowed down and stopped. The moving load component bearing against the contact or stop element causes the piston to be axially moved in the housing and thereby to displace a hydraulic fluid through a throttling arrangement, so as to dissipate the kinetic energy of the moving load component.

Further according to the invention, an adjusting ring, with which the damping coefficient of the shock absorber can be adjusted, is arranged surrounding the piston rod at the first end of the shock absorber housing through which the piston rod protrudes. Moreover, a support element is provided by a rigid part of the housing itself, preferably at the first end of the housing through which the piston rod protrudes. The support element is arranged and adapted to cooperate with the contact or stop element, so that the stop element will bear directly against the support element without bearing against the adjusting ring, when the piston has traveled to the end of the maximum allowable piston stroke. Preferably, the stop element comprises a pot-shaped or cup-shaped stop cap with a hollow cup space therein, which accommodates the adjusting ring therein when the protruding rim of the cup-shaped stop cap bears against the support element in the end position at the maximum allowable travel of the piston.

With the inventive arrangement of a shock absorber, in the case of a large moving load bearing against the stop element, the arising forces will be transmitted directly from the stop element into the support element which is a rigid part of the shock absorber housing itself, once the piston and parts connected thereto have reached the end limit of the maximum allowable travel. In this manner, there is no danger of applying a load from the stop element onto the adjusting ring, which might otherwise damage the rotatable adjusting ring. The rigid positive stop and contact of the stop element against the rigid support element of the housing itself enables an especially large force transmission and force introduction directly from the stop element into the robust housing of the shock absorber, without causing any possible damage of the components of the shock absorber or any interference or interruption of the proper functioning thereof.

Even though the adjusting ring protrudes axially from the first end of the shock absorber housing, and is thus the furthest outwardly protruding part of the shock absorber housing or body, the adjusting ring is completely protected and will not have any forces introduced thereto when the stop cap bears against the support surface at this end of the housing. Thus, the invention provides the advantages of a very simple adjustability of the damping characteristic of the shock absorber by simply turning the adjusting ring (when it is exposed, i.e. uncovered by the stop cap being moved to a position away from the end limit position in which the stop cap encloses the adjusting ring). In combination therewith, the invention provides the advantages of a positive mechanical stop to limit the travel of the piston and of the stop element connected thereto, with a positive mechanical load introduction from the stop cap directly into the robust housing of the shock absorber.

Preferably, the cup-shaped stop cap includes an outer cylindrical A sleeve terminating at an annular or ring-shaped end face of the cap, which contacts against a corresponding annular or ring-shaped end face of the housing part forming the stop element. This arrangement is provided radially outwardly and circumferentially around the adjusting ring. In this manner, the adjusting ring is completely protected against any loads being applied thereto, and instead the force introduction is carried out through a rather large surface area distributed about the circumference of the cylindrical shock absorber housing. Thereby, the surface pressure or loading at any given area is maintained uniformly at a correspondingly low level. Preferably in this context, the outer diameter of the stop cap corresponds to the outer diameter of the cylindrical housing in the area of an end ring of the housing that faces toward and contacts the rim of the stop cap. This provides a flush exterior transition between the stop cap and the shock absorber housing when the piston has been depressed inwardly to the end limit of its maximum travel.

According to a further embodiment detail of the invention, a pressure reservoir chamber or accumulator chamber is formed or defined in an annular chamber on the backside of the piston between the inner circumferential surface of the housing and an outer circumferential surface of a bearing sleeve or guide sleeve that guides and seals the piston rod extending through a central bore thereof. On the other hand, the outer cylindrical surface of the guide sleeve is sealingly supported on the inner circumferential surface of the housing. Thereby, simultaneously, the pressure reservoir or accumulator chamber is bounded at an end face facing toward the exterior of the shock absorber. In this context, the inner diameter of the stop cap preferably corresponds to the inner diameter of the housing in the area of the accumulator chamber.

A further detail of the invention provides that the stop cap is preferably screwed or bolted onto the free end of the piston rod, and that a return spring is arranged coaxially around the piston rod, to be braced between the interior of the stop cap and an end surface of the housing, for example coaxially radially inwardly relative to the adjusting ring. This return spring bears against the stop cap to press the stop cap outwardly away from the shock absorber housing, and thereby to return the piston rod and the piston from the end limit stop position (or retracted position) to the initial load receiving and damping position (or extended position). In this context, the compressed return spring is preferably fully accommodated and enclosed within the hollow inner cup space of the stop cap in the end limit stop position. Preferably, the outer diameter of the spiral or helical return spring is smaller than the inner diameter of the adjusting ring, so as to fit radially within the adjusting ring as mentioned above.

Further according to the invention, the adjusting ring is secured to a bearing sleeve in a rotation-fixed manner, i.e. so that the adjusting ring cannot rotate relative to the bearing sleeve, but rather the adjusting ring and the bearing sleeve will turn or rotate in common with each other. A turning or rotation of the bearing sleeve by correspondingly turning the adjusting ring serves to selectively cover or uncover the effective cross-sectional flow passage area of at least one throttle opening provided in a pressure pipe, so as to adjust the damping coefficient of the shock absorber.

BRIEF DESCRIPTION OF THE DRAWINGS

In order that the invention may be clearly understood, it will now be described in connection with example embodiments, with reference to the accompanying drawings, wherein:

FIG. 1 is a partially sectioned or broken-open perspective view of a shock absorber according to the invention, in an extended position of the piston rod;

FIG. 2 is a side view of the partially sectioned shock absorber according to FIG. 1;

FIG. 3 is a partially sectioned perspective view similar to that of FIG. 1, but showing the shock absorber in the completely retracted position of the piston rod; and FIG. 4 is a side view of the shock absorber partially in section, similar to the view of FIG. 2, but showing the completely retracted position of the piston rod according to FIG. 3.

DETAILED DESCRIPTION OF PREFERRED EXAMPLE EMBODIMENTS AND OF THE BEST MODE OF THE INVENTION

The shock absorber 1 shown in FIGS. 1 to 4 comprises a cylindrical pipe-shaped housing 2, of which the outer cylindrical surface 3 is preferably entirely and continuously provided with an external threading which allows the shock absorber 1 to be mounted and secured in any suitable mounting bracket or machine component or the like. Other means for mounting the shock absorber may be provided instead of or in addition to the external threading. The shock absorber 1 further comprises a pressure pipe 5 arranged in the housing 2 coaxially relative to the lengthwise axis 4 thereof. The pressure pipe 5 in this embodiment is generally a hollow cylindrical sleeve open at both ends thereof, but alternatively it could be closed at one end thereof. In the latter embodiment, the closed end of the pressure pipe 5 can simultaneously form the closed end of the housing 2.

A spiral groove 7 is formed in an inner cylindrical surface 6 of the housing 2, whereby this groove 7 extends over an axial range 8 defining a grooved portion 8 of the housing 2. The cross-section of the groove 7 is preferably rectangular or slightly trapezoidal. The spiral arrangement of the groove 7 forms respective webs 9 of the inner wall or cylindrical surface 6 of the housing 2 respectively remaining between two adjacent turns of the spiral groove 7. The inner diameter of the housing 2, defined as the diameter of the inner space bounded by the inwardly facing surfaces of these webs 9, i.e. the inner diameter of the housing 2 before forming the spiral grooves 7 therein, corresponds to the outer diameter of the pressure pipe 5.

Thus, the pressure pipe 5 is arranged with a very tight clearance fit within the housing 2, which essentially completely prevents the passage of hydraulic fluid through the interface between the pressure pipe 5 and the inner cylindrical surface 6 of the housing 2. In other words, no significant amount of hydraulic fluid will leak between the webs 9 and the pressure pipe 5 from one turn of the spiral groove 7 to a neighboring turn of the spiral groove 7, but instead, the hydraulic fluid is forced to flow along the spiral groove 7. Additionally, from the spiral groove 7, the hydraulic fluid may flow axially along flow paths formed by flattened areas on the outer surface 19 of the pressure pipe 5, as will be described below.

The shock absorber 1 further includes a piston 10 which is arranged and supported with a tight sealing fit while still being axially slidable within the pressure pipe 5. A piston mount 11 connects the piston 10 to a piston rod 12, which extends outwardly out of a first end 45 of the housing 2 in a sealed manner. Namely, the piston rod 12 extends through a lip seal 31 as will be described further below. A stop cap 13 is secured to the outwardly protruding free end of the piston rod 12, i.e. opposite from the piston 10. This stop cap 13 serves to limit the maximum compressive or retractive travel of the piston 10 and the piston rod 12 when a moving load component bears against the outer end surface 33A of the end wall 33 of the stop cap 13. This is achieved by the stop cap 13 bearing against a rigid part of the housing 2 as will be described further below.

Thereby, the limiting function of the stop cap 13 prevents the piston rod 12 or other components of the shock absorber 1 from being overloaded and resultantly upset, compressed, or buckled when an excessive load contacts and bears against the stop cap 13 of the shock absorber 1 and exceeds the damping effect of the maximum stroke of the piston 10. The function of this stop cap 13 will be described in further detail below.

A spiral return spring 14 is arranged coaxially around the piston rod 12 and is thus supported radially by the piston rod 12. Moreover, the return spring 14 is supported and braced axially between the stop cap 13 and the end face of the housing 2 facing toward the stop cap 13. This return spring 14 serves to automatically extend the piston rod 12 back out of the housing 2, after a load that has compressed or retracted the shock absorber 1 has again been removed.

The housing 2 is closed at its second end 46 by a floor part or end closure B. A pressure chamber 15 is formed between the piston 10 and the end closure B. On the opposite side of the piston 10 there is formed an annular receiver chamber 16 surrounding the piston rod 12, and a further annular pressure reservoir or accumulator chamber 17 which adjoins the receiver chamber 16 in a direction toward the stop cap 13. The accumulator chamber 17 is closed and sealed at the end face at the first end 45 of the housing 2, but is open for fluid flow communication with the receiver chamber 16. The accumulator chamber 17 is at least partially filled with a closed-cell synthetic foam material, which is compressible without allowing permeation and saturation thereof by the hydraulic fluid provided in the pressure chamber 15, the receiver chamber 16, and the accumulator chamber 17.

The present illustrated embodiment has an adjustable throttle arrangement including the pressure pipe 5, which has nine throttle openings 18 arranged linearly and spaced apart equidistantly from one another in an axial row. These throttle openings 18 penetrate through the wall of the pressure pipe 5. The pressure pipe 5 further has two flattened areas that extend linearly in the axial direction along the entire axial length of the pressure pipe 5, and that are spaced circumferentially by 180° from each other. These flattened areas are provided on the outer cylindrical surface 19 of the pressure pipe 5 so as to form a gap channel between the pressure pipe 5 and the inner cylindrical surface 6 of the shock absorber housing 2. These two gaps formed by the flattened areas provide substantially unrestricted return flow paths for the hydraulic fluid to flow in an axial direction therealong. Throughout this specification, the terms "axial", "axially" and the like, are with reference to a central longitudinal axis of the cylindrical shock absorber housing 2.

The pressure pipe 5 further includes or is provided with two follower pins 22 that are located 180° circumferentially apart from one another and protrude axially from an end face 21 of the pressure pipe 5. These follower pins 22 are offset circumferentially from the flattened areas on the outer cylindrical surface 19 of the pressure pipe 5, respectively by about 90°. These follower pins 22 respectively reach into and engage mating recesses or openings in an end of a bearing sleeve 25 which is rotatably supported in the housing 2 axially adjacent to the pressure pipe 5.

The above mentioned end closure B is further screwed into the opposite end 23 of the pressure pipe 5, i.e. the end opposite the bearing sleeve 25. The end closure B is secured in a rotation-fixed manner to the pressure pipe 5, so that the pressure pipe 5 will rotate together with the end closure B. In this manner, it becomes additionally possible to adjust the damping characteristic of the shock absorber 1 also from this second end 46 of the housing 2, for example by means of an internal hex socket or allen head, or a screwdriver slot or the like in which an appropriate tool may be engaged so as to turn the end closure B and thereby adjust the rotational position of the pressure pipe 5 from the outside. For this purpose, the end closure B is retained in the end 46 of the housing 2 while being allowed to rotate relative thereto, and is provided with a hydraulic seal therebetween.

An inner cylindrical bearing surface 26 of the bearing sleeve 25 receives and slidingly guides the piston rod coaxially therein.

The outer cylindrical surface 27 of the bearing sleeve 25 is rotatably supported and sealed against the inner cylindrical surface 6 of the housing 2 in the respective associated axial portion thereof that is not provided with the spiral groove 7, i.e. a portion other than the grooved portion 8. The bearing sleeve 25 is sealed by a seal ring 30 relative to the inner cylindrical surface of the housing 2, and is sealed by means of a lip seal 31 relative to the outer cylindrical surface of the piston rod 12. An adjusting collar 28 of the bearing sleeve 25 extends and protrudes in the axial direction out of the housing 2 of the shock absorber 1 at the first end 45 thereof, and is secured or integrally provided in a rotation-fixed manner with the adjusting ring 29. Thus, a turning or rotation of the adjusting ring 29 (e.g. by hand or by a wrench or the like engaging flat surfaces 29A of the ring 29) correspondingly causes a turning or rotation of the bearing sleeve 25 in its entirety, and then via the follower pins 22, this achieves a corresponding turning or rotation of the pressure pipe 5 relative to the inner cylindrical surface 6 of the housing 2.

Such rotation of the pressure pipe 5 changes the respective alignment of the throttle openings 18 relative to the spiral groove 7 and the spiral web 9 respectively between adjacent turns of the groove 7. This in turn adjusts the open flow cross-section of the throttle openings 18 so as to adjust the damping coefficient of the shock absorber 1. In other words, as the extent of overlapping registration of the openings 18 with the spiral groove 7 is reduced, the throttling constriction is increased, and the shock absorber has a "harder" damping character.

In order to slow down and stop a moving load such as a machine component or the like, this load is contacted against the end surface 33A of the stop cap 13, when the shock absorber 1 is initially in the extended position or damping condition shown in FIGS. 1 and 2. This moving load accordingly presses against the stop cap 13 and pushes the stop cap 13, and therewith the piston rod 12 further into the housing 2, so that the piston 10 is moved further toward the right in FIGS. 1 and 2. This causes the pressure chamber 15 to be reduced in volume, which in turn causes the hydraulic fluid to be displaced from the pressure chamber 15 out through the throttle openings 18 of the pressure pipe 5. From there, the hydraulic fluid, under the throttling action of the throttling openings 18, flows into the spiral groove 7, and from there into the linear axially extending flow passages formed by the linear axial flattened areas on the outer cylindrical surface of the pressure pipe 5, i.e. between the pressure pipe 5 and the housing 2.

From those flow passages, the hydraulic fluid flows to the opposite or backside of the piston 10, where the fluid flows into the receiver chamber 16 and from there into the accumulator chamber 17. Thereby, the closed cell foam material in the accumulator chamber 17 is correspondingly compressed and pressurized due to the volume and pressure of the inflowing fluid as caused by the piston 10 moving toward the right while reducing the volume of the pressure chamber 15 and thereby displacing the hydraulic fluid. Although the receiver chamber 16 increases in volume while the pressure chamber 15 is being reduced in volume, there is a volume differential between the respective increasing and decreasing volumes of these two chambers due to the volume of the piston rod 12 being pushed into the housing 2 and taking up space in the receiver chamber 16. The accumulator chamber 17 serves to compensate for this volume difference between the diminishing volume of the pressure chamber 15 and the increasing volume of the receiver chamber 16.

As the piston 10 progresses further toward the right, i.e. toward the second end 46 of the housing 2, the diminishing size of the pressure chamber 15 means that fewer of the throttle openings 18 will be available for allowing the fluid to flow out of the chamber 15 into the spiral groove 7. Thus, as the piston 10, the piston rod 12 and the stop cap 13 approach the retracted position, the damping characteristic of the shock absorber becomes progressively "harder". This also helps to avoid a sudden large impact force being applied when the stop cap 13 reaches the end of its travel.

The stop cap 13 has a generally cup-shaped configuration with a hollow cup space therein. In this regard, the stop cap 13 comprises a thick-walled floor part or end wall 33 of which the outer surface forms the end surface 33A for receiving an external load, as well as an annular collar 34 extending from the end wall 33 toward the shock absorber housing 2. The open cup space is thus oriented toward the shock absorber housing 2. The end wall 33 has a stepped central bore or hole therein, into which an allen head screw or internal hex bolt 35 is inserted, so as to secure the stop cap 13 rigidly onto the free end of the piston rod 12.

An end of the return spring 14 extends into the hollow cup space of the stop, cap 13, and bears against an internal annular surface 36 of the end wall 33 of the stop cap 13. The inner diameter of the collar part 34 is slightly larger than the outer diameter of the adjusting ring 29, so as to provide a minimum radial passage clearance therebetween. The inner diameter of the collar part 34 essentially corresponds to the inner diameter of the housing 2 in the area of the accumulator chamber 17. The outer diameter of the collar part 34 corresponds to the outer diameter of an end ring 37 of the housing 2. This end ring 37 is preferably not provided with an external threading.

When the mass and/or the velocity, i.e. in general the total kinetic energy, of the moving load that contacts and presses against the stop cap 13 exceeds the maximum energy dissipating capacity of the damping function of the shock absorber 1, then the piston rod 12 and piston 10 will be slidingly moved to the maximum allowable extent toward the right in FIGS. 1 and 2, i.e. to the maximum allowable retracted condition of the shock absorber 1 as shown in FIGS. 3 and 4. At this point, the collar part 34 of the stop cap 13 will move over the adjusting ring 29, and then the annular or ring-shaped end face 38 of the collar part 34 of the stop cap 13 will contact and stop against a corresponding annular or ring-shaped end face 39 of the-end ring 37 of the housing 2. This direct mechanical contact of the stop cap 13 against the end surface 39 of the end ring 37 of the housing 2 positively stops and limits the maximum stroke of the piston 10, and provides a direct force introduction of the impact force and the remaining kinetic energy directly from the stop cap 13 into the shock absorber housing 2. In this manner, a force introduction into the adjusting ring 29 and the bearing sleeve 25 is avoided.

The fully compressed and retracted condition of the shock absorber 1, i.e. when the load has driven the stop cap 13 against the housing of the piston 10 is shown in FIGS. 3 and 4. Once the load has been stopped as described above, and has then been removed from the stop cap 13 in any manner, such that the load is no longer effective on the piston 10, the return force applied by the return spring 14 will once again extend the piston rod 12 out of the housing 2 and thereby move the piston 10 back to its initial damping position as shown in FIGS. 1 and 2.

When the return spring 14 moves the piston rod 12 and piston 10 back to the initial starting condition, it is desirable to achieve as rapid a return travel as possible. In this regard it is advantageous if the hydraulic oil does not need to flow exactly in the opposite direction along the damping flow path that is followed during the damping operation as described above, i.e. particularly with the hydraulic oil flowing through the throttling openings 18. To avoid this, a separate return flow path is provided, for example by means of a non-return valve 32 in the piston 10. such a non-return valve 32, or any conventionally known return flow passage arrangement, allows the hydraulic fluid to flow therethrough in a substantially unthrottled and unhindered manner from the receiver chamber 16 and the accumulator chamber 17 back into the pressure chamber 15 as the piston 10 is again extended or moved toward the left in the drawing FIGS. 1 to 4. Note that the valve body of this non-return or one-way valve 32 is not shown in detail, but rather only the valve opening of the valve 32 is schematically illustrated in FIG. 1.

As mentioned above, the damping characteristic of the shock absorber 1 can be adjusted by relatively rotating the pressure pipe 5 with respect to the spiral groove 7 in the housing 2. Due to the spiral configuration of the groove 7, the throttle openings 18 will overlap and communicate to a greater or lesser extent with the opening cross-section of the groove 7, depending on the rotational position of the pressure pipe 5 relative to the housing 2. In this regard, the center spacing of the throttle openings 18 axially from each other corresponds to the pitch or axial spacing of the successive turns of the groove 7.

When it is desired to achieve the highest damping coefficient with a small travel velocity of the piston 10, the pressure pipe 5 is rotated so that the throttle openings 18 become aligned substantially with the spiral web 9 respectively between neighboring turns of the groove 7. In this context, the diameter of each throttle opening 18 is preferably slightly smaller than the width of the web 9, to ensure that the throttle openings 18 can be substantially entirely closed so as to achieve a sufficiently high damping even for very small travel velocities.

On the other hand, if a high travel velocity of the load and thus of the piston 10 is required, then the pressure pipe 5 should be rotated so that the throttle openings 18 are substantially completely aligned with and providing free open communication into the opening cross-section of the spiral groove 7, in order to achieve a sufficiently rapid through-flow of the hydraulic fluid. The adjustment of the shock absorber 1 in this manner can be achieved by rotating the adjusting ring 29 so as to correspondingly rotate the bearing sleeve 25, or by rotating the floor part or end closure B as discussed above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A shock absorber for decelerating a moving load, comprising:
    a hollow housing having a hollow chamber therein and terminating at respective opposite first and second housing ends;
    a piston axially slidably arranged in said hollow chamber in said housing;
    a piston rod having a first rod end that protrudes out of said first housing end and a second rod end that is opposite said first rod end and that is connected to said piston;
    a hydraulic fluid in said hollow chamber in said housing;
    an adjustable hydraulic throttle arrangement having a variable hydraulic throttle passage, arranged in said housing;
    an adjusting ring that is arranged at a fixed location adjacent to and protrudes out from said first housing end and that is connected to said adjustable hydraulic throttle arrangement so as to be adapted to adjust said variable hydraulic throttle passage so as to adjust a damping characteristic of said shock absorber; and
    a stop element comprising a cup-shaped stop cap that is connected to said first rod end, that defines a hollow cup space radially inwardly therein which is open toward said first housing ends and that includes a contact surface adapted to have the moving load bear thereagainst;
    wherein said cup-shaped stop cap, said piston rod and said piston are movable together from an extended position to a retracted position relative to said housing due to a force applied to said stop cap by the moving load, while said piston displaces at least some of said hydraulic fluid through said variable hydraulic throttle passage;
    wherein said housing includes a rigid support element as a part of said housing, and said stop cap bears directly against said support element in said retracted position to transmit a force from said stop cap directly to said support element so as to limit a stroke of said stop element, said piston rod and said piston; and
    wherein said adjusting ring is received and accommodated radially inwardly in said hollow cup space of said stop cap in said retracted position without said stop cap directly contacting said adjusting ring; and
    wherein said adjusting ring remains at said fixed location adjacent to said first housing end both when said stop cap is in said retracted position and when said stop cap is in said extended position, so that said adjusting ring is outside of said hollow cup space of said stop cap in said extended position.

2. The shock absorber according to claim 1, wherein said rigid support element comprises a ring-shaped end surface of said housing, and said stop cap includes a ring-shaped rim surface that bears against said ring-shaped end surface radially outwardly around said adjusting ring when said stop cap is in said retracted position.

3. The shock absorber according to claim 2, wherein said ring-shaped rim surface has an inner diameter larger than an outer diameter of said adjusting ring.

4. The shock absorber according to claim 2, wherein said housing includes a main housing body and an end ring protruding therefrom and forming said rigid support element and terminating in said ring-shaped end surface, and said end ring has an outer diameter corresponding to an outer diameter of said stop cap.

5. The shock absorber according to claim 2, wherein said hollow chamber in said housing includes an accumulator chamber adjacent to said first housing end, and said housing has an inner diameter in said accumulator chamber that corresponds to an inner diameter of said stop cap in said hollow cup space.

6. The shock absorber according to claim 1, wherein said adjusting ring protrudes axially outwardly beyond said support element.

7. The shock absorber according to claim 1, further comprising a return spring arranged and braced against said stop cap, wherein said return spring exerts a biasing force on said stop cap that urges said stop cap, said piston rod and said piston from said retracted position to said extended position.

8. The shock absorber according to claim 7, wherein said stop cap is connected to said first rod end by a screw connection.

9. The shock absorber according to claim 7, wherein said return spring is arranged coaxially around said piston rod, a first end of said return spring is received in said hollow cup space and bears against said stop cap, and a second end of said return spring is received radially inwardly inside said adjusting ring.

10. The shock absorber according to claim 9, wherein said return spring is entirely accommodated and enclosed within said hollow cup space when said stop cap is in said retracted position.

11. The shock absorber according to claim 1, wherein said adjustable hydraulic throttle arrangement comprises a pressure pipe that has at least one throttle opening as a component of said variable hydraulic throttle passage and that is arranged in said hollow chamber in said housing, wherein said piston is slidably arranged in said pressure pipe, and further comprising a bearing sleeve through which said piston rod is slidably supported and which connects said adjusting ring to said pressure pipe in a rotation-transmitting manner so that rotation of said adjusting ring correspondingly rotates said pressure pipe and thereby varies an open flow cross-section of said at least one throttle opening.

12. The shock absorber according to claim 11, wherein said variable hydraulic throttle passage of said adjustable hydraulic throttle arrangement further includes a spiral groove on an inner cylindrical wall of said housing bounding said hollow chamber, and at least one linearly axially extending flat planar area on an outer peripheral surface of said pressure pipe facing said inner cylindrical wall of said housing.

13. The shock absorber according to claim 11, further comprising a rotatable end closure that is rotatably received in and penetrates through said second housing end and that is fixedly connected to said pressure pipe.

14. A shock absorber for decelerating a moving load, comprising:
- a hollow housing having a hollow chamber therein and terminating at respective opposite first and second housing ends;
- a piston axially slidably arranged in said hollow chamber in said housing;
- a piston rod having a first rod end that protrudes out of said first housing end and a second rod end that is opposite said first rod end and that is connected to said piston;
- a hydraulic fluid in said hollow chamber in said housing;
- a stop element comprising a cup-shaped stop cap that is connected to said first rod end, that defines a hollow cup space radially inwardly therein which is open toward said first housing end, and that includes a contact surface adapted to have the moving load bear thereagainst;
- a return spring arranged and braced against said stop cap; and
- an adjusting ring that is arranged at said first housing end and adapted to adjust a damping characteristic of said shock absorber;
- wherein said cup-shaped stop cap, said piston rod and said piston are movable together from an extended position to a retracted position relative to said housing due to a force applied to said stop cap by the moving load, while said piston displaces at least some of said hydraulic fluid in said hollow chamber;
- wherein said housing includes a rigid support element as a part of said housing, and said stop cap bears directly against said support element in said retracted position to transmit a force from said stop cap directly to said support element so as to limit a stroke of said stop element, said piston rod and said piston;
- wherein said return spring is arranged coaxially around said piston rod, and a first end of said return spring is received in said hollow cup space and bears against said stop cap so as to exert a biasing force on said stop cap that urges said stop cap, said piston rod and said piston from said retracted position to said extended position;
- wherein said return spring is entirely accommodated and enclosed radially inwardly within said hollow cup space when said stop cap is in said retracted position;
- and wherein said adjusting ring is received and accommodated radially inwardly in said hollow cup space of said stop cap in said retracted position without said stop cap directly contacting said adjusting ring.

* * * * *